July 23, 1935.  F. TUTTLE  2,008,973

MOTION PICTURE APPARATUS

Filed June 6, 1933  2 Sheets-Sheet 1

Inventor:
Fordyce Tuttle,
By
Attorneys.

July 23, 1935.  F. TUTTLE  2,008,973
MOTION PICTURE APPARATUS
Filed June 6, 1933  2 Sheets-Sheet 2
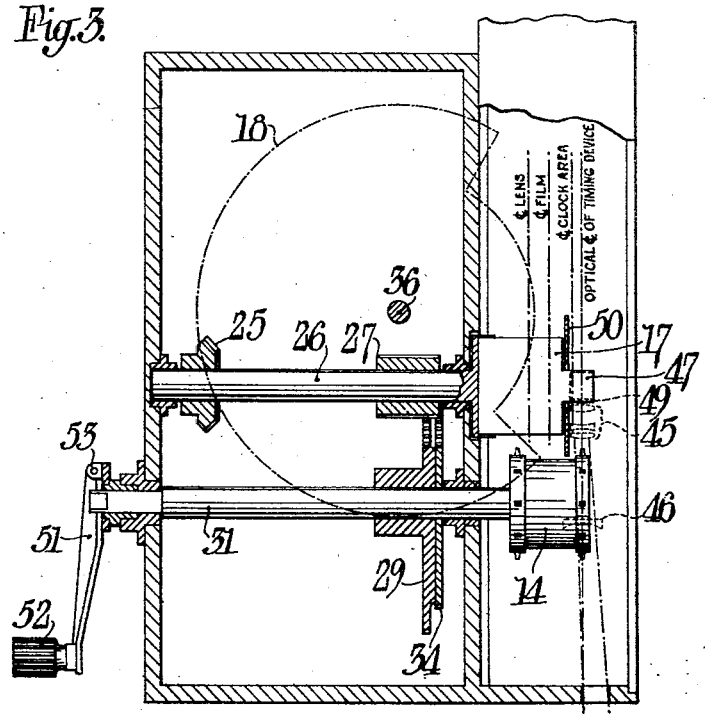
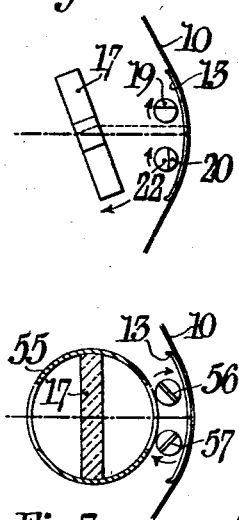
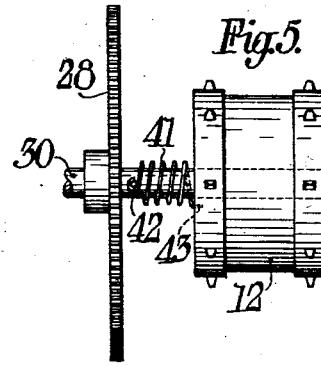
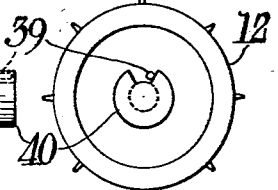
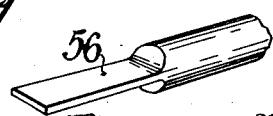
Inventor:
Fordyce Tuttle, Patented July 23, 1935

2,008,973

UNITED STATES PATENT OFFICE 2,008,973

MOTION PICTURE APPARATUS

Fordyce Tuttle, Rochester, N. Y., assignor to Eastman Kodak Company, Rochester, N. Y., a corporation of New York Application June 6, 1933, Serial No. 674,526

5 Claims. (Cl. 88—16.8)

My invention relates to photographic apparatus either for taking or projecting motion pictures and more particularly to motion picture apparatus in which the film moves continuously rather than intermittently.

It is an object of my invention to provide motion picture apparatus in which the film moves continuously and in which all moving parts follow simple circular movements.

Another object of my invention is the provision of a high speed non-intermittent camera having a minimum number of moving parts and provided with simplified framing means of small size whereby the apparatus may be made very compact.

Another object of my invention is the provision in apparatus of this type of a novel auxiliary optical system for recording, simultaneously with the picture, additional subject matter such as chronometric information.

Other objects and advantages of my invention will appear from the following description when read in connection with the accompanying drawings and its scope will be pointed out in the appended claims.

According to one aspect of my invention the images formed by the main objective and the auxiliary optical system are caused to follow the film movement during an exposure by a rotating glass plate and suitable shutter means to permit light to reach the film only during the time the plate is approximately perpendicular to the optical axis. The images are framed on the film by means of small vane-like members which rotate synchronously with the shutter means and the glass plate.

The appended drawings show by way of example two embodiments of my invention.

Fig. 3 is a corresponding front view partly in section and with a number of parts omitted showing the location of certain parts relative to the film.

Fig. 4 shows the location of the framing means relative to the gate.

Figs. 5 and 6 are details showing a spring mounted sprocket which may be used for tensioning the film behind the gate.

Fig. 7 shows in section an alternative form of shutter, and

Fig. 8 is a perspective view of an alternative form of framing means.

Figure 1:
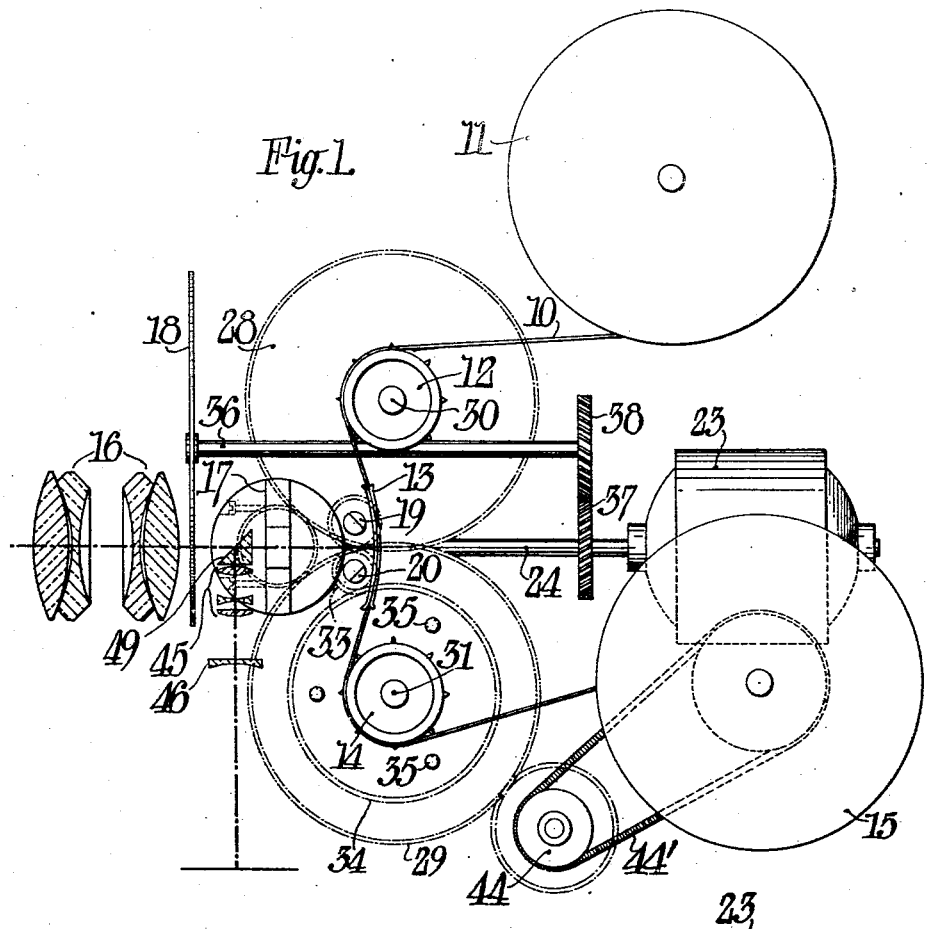
Fig. 1 is an elevation partly in section diagrammatically showing one preferred embodiment of my invention.
Figure 2:
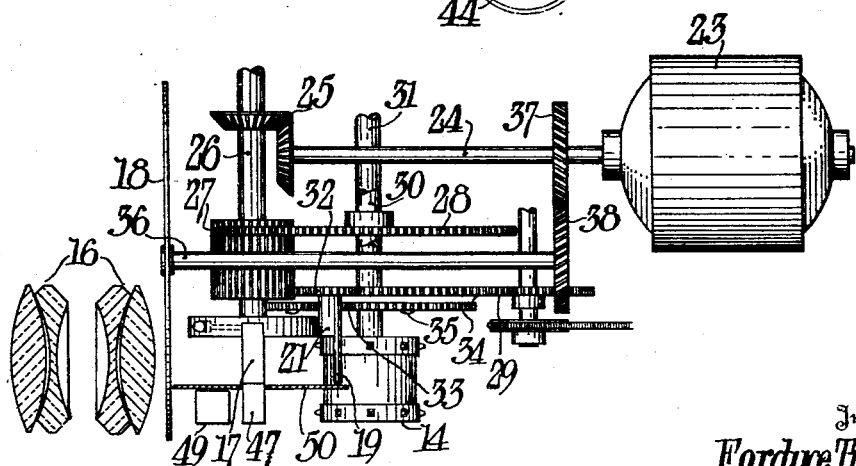
Fig. 2 is a corresponding plan view partly in section showing the organization of certain of the operating parts.

For convenience of description, my invention is shown in Figs. 1, 2 and 3 as comprising a medium high speed motion picture camera with many of the parts not necessary for an understanding of the invention omitted. The film 10 carried by a supply wheel 11 is trained over a tension sprocket 12, a gate 13 and a sprocket 14 to a take-up reel 15. The main optical system of the camera includes an objective 16 and a glass plate 17 which is adapted to be rotated to shift the image in the gate as hereinafter described. The objective 16 may be of any suitable type and is here shown as consisting of four elements as described in Patent No. 1,620,337 issued March 8, 1927 to C. W. Frederick, et al. The present objective 16 is designed to work at a speed of f. 2.0 and to have a focal length of 1.5 inches.

The deflection produced by the rotating glass plate 17 depends upon its index to refraction and upon its thickness; in the present embodiment I use white optical glass having an index of refraction of 1.524 and a thickness of 6.6 mm. and the deflection is such that during the displacement of the film 10 past the gate 13 the image formed on the film 10 will remain stationary relatively thereto.

As best shown in Fig. 3 a shutter 18 provided with an open sector of approximately 120 degrees is mounted to be rotated in the light path between the objective 16 and the plate 17. The shutter 18 serves to permit light to fall on the film 10 only during the time the angle between the glass plate 17 and the perpendicular to the optic axis is so small as not to distort seriously the image formed on the film 10.

For framing longitudinally the image formed on the film 10, I provide novel framing means which comprises a pair of vanes 19 and 20 mounted for rotation quite close to the film 10. As best shown in Figs. 2 and 4 the vanes 19 and 20 may be formed by removing, along a portion of the length of cylindrical rods 21 and 22 a secant part to leave the plano-cylindrical parts 19 and 20 respectively. It becomes immediately apparent from an inspection of Figs. 1 and 4 that synchronous rotation of the vanes 19 and 20 in the direction indicated by the arrows will cause the apparent opening between them to move downwardly between the plate 17 and the film 10. Fig. 4 shows the relative position of the plate 17 and the vanes 19 and 20 at the instant the shutter 18 rotates into position to start an exposure and Fig. 1 shows their positions at the mid point of an exposure.

The sprockets 12 and 14, the vanes 19 and 20, the glass plate 17 and the shutter 18 are all adapted to be driven in a fixed time relation by a suitable motor 23. The shaft 24 of the motor 23 drives, through bevel gear 25, a shaft 26 upon one end of which is mounted the plate 17. The shaft 26 is provided with a gear 27 which serves to drive the sprockets 12 and 14 through gears 28 and 29 and their respective shafts 30 and 31. A small gear 32 carried by the rod 21 meshes with the gear 29 to rotate the framing vane 19. The vane 20 is similarly driven by a gear 33 meshing with an auxiliary gear 34 secured to the gear 29 by rivets 35. The shutter 18 carried by a shaft 36 is driven by the shaft 24 through helical gears 37 and 38.

In the illustrated embodiment the gear ratios are such that for each revolution of the sprockets 12 and 14 the plate 17 makes four revolutions and the shutter 18 and the vanes 19 and 20 each make eight revolutions.

In order to assure the proper tension on the film 10 as it passes the gate 13 the upper sprocket 12 is rotatably mounted on its shaft 30. The possible rotation of the sprocket 12 is limited by any suitable means, shown in Fig. 5 as comprising a pin 39 extending from the sprocket 12 into a cutout portion of the head 40 carried by the end of the shaft 30. A spring 41 encircling the shaft 30 and secured thereto at one end 42 and having its other end 43 secured to the sprocket 12 serves to bias the sprocket 12 relative to its shaft 30 to the position shown in Fig. 6. When the film 10 is threaded through the camera it is first caused to engage the sprocket 12 and then pulled to rotate the sprocket 12 against the bias set up by the spring 41. The film is then trained over the gate 13, the lower sprocket 14 and to the take-up reel 15. A pulley 44 driven by the gear 29 may be provided to rotate the take-up reel 15 by means of a belt 44'. It will now be found that the spring 41 places a constant tension on the film, the amount of this tension depending upon the strength of the spring 41 and the angle to which the sprocket 12 is rotated before placing the film on the lower sprocket 14.

In addition to taking pictures of any desired moving object, the high speed camera above described is provided with an auxiliary optical system for taking, simultaneously with the object, a picture of a suitable timing device. This optical system includes an objective 45, a negative lens 46 which may have a power of about 9 diopters and an integral extension 47 of the rotating glass plate 17. Light from the dial of a timing device 48, which is preferably a chronoscope, after passing through the lens 46 and the objective 45 is deflected into a direction parallel to the optic axis of the main objective 16 by a prism 49. To prevent spreading of the light from one optical system onto the film area behind the other system an opaque partition 50 is positioned between the two systems and extends past the unsupported ends of the framing vanes 19 and 20 into close proximity to the gate 13. In order that the image of the dial of the chronoscope 48 may be formed on an area of the film 10 immediately adjacent the partition 50, the dial of the chronoscope is positioned to one side of the axis of the objective 45 as shown in Fig. 3 and accordingly it is imaged on the film 10 at a point to the left of this axis and next to the partition 50. If natural light is insufficient the dial of the chronoscope 48 may be artificially illuminated in any well known manner not shown. While for various reasons I prefer to use a chronoscope it is to be understood that any other suitable timing device is contemplated by my invention.

For advancing the film 10 through the camera at a very slow rate, as might be desirable in making titles and the like, a crank 51 having a handle 52 and pivoted at 53 as shown in Fig. 3 is movable into and out of engagement with the end of the shaft 31 carrying the lower sprocket 14.

The camera as described above is suitable for taking pictures at relatively high speed but if it is desired to construct a camera to operate at an extremely high speed I prefer to use a barrel shutter and balanced framing vanes 56 and 57 as shown in Fig. 7. As is well understood the flanges 55 of the barrel shutter interrupt the exposure while the plate 17 is at too great an angle to the light beam axis in the same manner as did the disk shutter 18 above described.

The vanes 56 and 57 function in the same way as the vanes 19 and 20 to frame image on the film but, as shown in Fig. 8 they are constructed so as to have their center of gravity coincident with their axes and are therefore better adapted for high speed.

While I have shown and described only two specific embodiments of the rotating framing means it is to be understood that my invention is not limited thereto and other non-cylindrical and/or asymmetrical framing means may be used. Various modifications will suggest themselves to those skilled in the art without departing from the spirit of my invention or its scope as pointed out in the appended claims.

What I claim as new and desired to secure by Letters Patent of the United States is:

1. In a motion picture camera of the type in which the film is advanced continuously and the image formed on the film is caused to follow the film during each exposure thereof, a pair of vanes rotatable about axes parallel to the plane of the film and perpendicular to its direction of movement for defining the longitudinal extent of the image formed on the film, said vanes having a configuration asymmetrical about their axes of rotation adapted upon rotation to shift the opening between them relative to their axes, and means for rotating said vanes in an unvarying out of phase relation to shift said opening in the direction of the film movement during each exposure of the film.

2. In a motion picture camera of the type in which the film is advanced continuously past an exposure plane, a main objective and an auxiliary objective positioned to form images of their respective fields in the exposure plane, an opaque shield separating the light beams from the two lenses to the exposure plane, a glass plate of uniform thickness rotatable in the light beams between said objectives and said exposure plane, the width of the part of the plate in the path of the light beam transmitted by the main objective being substantially greater than the width of the part of the plate in the path of the light beam transmitted by the auxiliary objective, and means for framing the height of the image formed by said main objective.

3. A motion picture camera including an exposure gate, a main objective for forming an image on a part of the width of the exposure gate, an auxiliary objective for forming a separate image on the remaining part of the width of the gate, means for advancing uniformly and continuously a film past the exposure gate, unitary means for periodically shifting both images a short distance in the direction of and at the same rate as the moving film comprising a glass plate with parallel faces which is rotatably mounted between the exposure gate and said objectives, a partition opaque to light extending from said gate to a point in front of the glass plate and occupying a plane substantially parallel to and midway between the two image bearing light beams falling on said gate, an opening in the partition through which said plate extends into the light beam coming from said auxiliary objective, the part of said plate extending through the opening being substantially narrower than the part of said plate located in the light beam coming from said main objective, shutter means for cutting off the light to the film during a part of each half revolution of said plate, and means for rotating said plate and said shutter means in synchronism with the advancing of said film.

4. In a motion picture camera of the type in which the film is advanced continuously and the image formed on the film is caused to follow the film during each exposure thereof, a pair of rotatable framing means constituting opposite boundaries defining the longitudinal extent of the image formed on the film and adapted upon rotation to displace said boundaries longitudinally of the film and mechanism for rotating said framing means in definite phase relation to shift said boundaries in the direction of the film movement during each exposure of the film.

5. In a motion picture camera of the type in which the film is advanced continuously and the image formed on the film is caused to follow the film during each exposure thereof, framing means rotatable about axes parallel to the plane of the image for defining the upper and lower limits of the image formed on the film and adapted upon rotation to shift the limits of the image in a direction perpendicular to their axes and lengthwise of the film and means for rotating said framing means in a fixed phase relation to displace the upper and lower limits of the image in the direction of the film movement during each exposure of the film.

FORDYCE TUTTLE.